United States Patent [19]

Rudaz et al.

[11] 4,194,106
[45] Mar. 18, 1980

[54] METHODS AND DEVICES FOR CUTTING, ERODING, WELDING AND DEPOSITING METALLIC AND NON-METALLIC MATERIALS BY MEANS OF AN ELECTRIC ARC

[75] Inventors: Albi Rudaz, Givrins/VD; Albert Ferrari, Gland/VD, both of Switzerland

[73] Assignee: Secheron Soudure S.A., Gland/VD, Switzerland

[21] Appl. No.: 913,061

[22] Filed: Jun. 6, 1978

Related U.S. Application Data

[63] Continuation of Ser. No. 652,750, Jan. 27, 1976, abandoned.

[30] Foreign Application Priority Data

Jan. 27, 1975 [CH] Switzerland ............................ 919/75

[51] Int. Cl.² ................................................. B23K 9/08
[52] U.S. Cl. .................................. 219/123; 219/76.14; 219/124.1

[58] Field of Search ................. 219/121 P, 123, 76.14, 219/124.1; 13/11

[56] References Cited

U.S. PATENT DOCUMENTS

| | | | |
|---|---|---|---|
| 1,792,243 | 2/1931 | Richter | 219/123 |
| 2,652,440 | 9/1953 | Simmons | 13/11 |
| 3,131,091 | 4/1964 | Jones | 219/123 |
| 3,229,155 | 1/1966 | Carlson et al. | 219/123 |
| 3,381,171 | 4/1968 | Kienast | 219/123 |
| 3,594,609 | 7/1971 | Vas | 219/123 |

FOREIGN PATENT DOCUMENTS 1262526  4/1961  France ........................................ 13/11

*Primary Examiner*—Bruce A. Reynolds
*Assistant Examiner*—Clifford C. Shaw

[57] ABSTRACT

The trajectory and speed of a turning electric arc in a device for cutting, eroding, welding or depositing material are controlled by varying the voltage and frequency of a polyphase current supplied to pole pieces disposed about the arc. The arc may be formed into a practically continuous bell-shaped or cylindrical sheet, thereby increasing the arc power.

1 Claim, 7 Drawing Figures

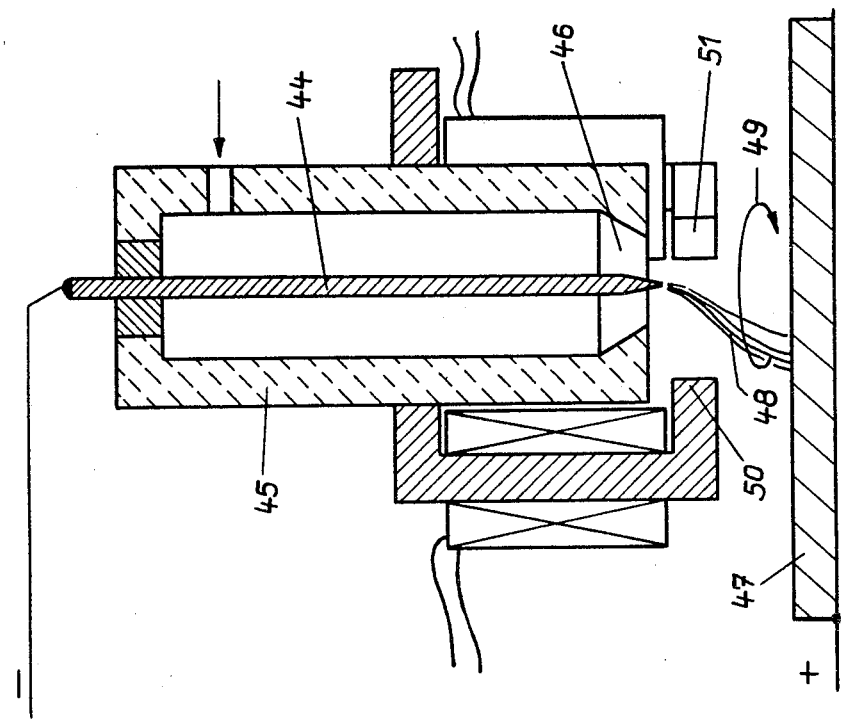
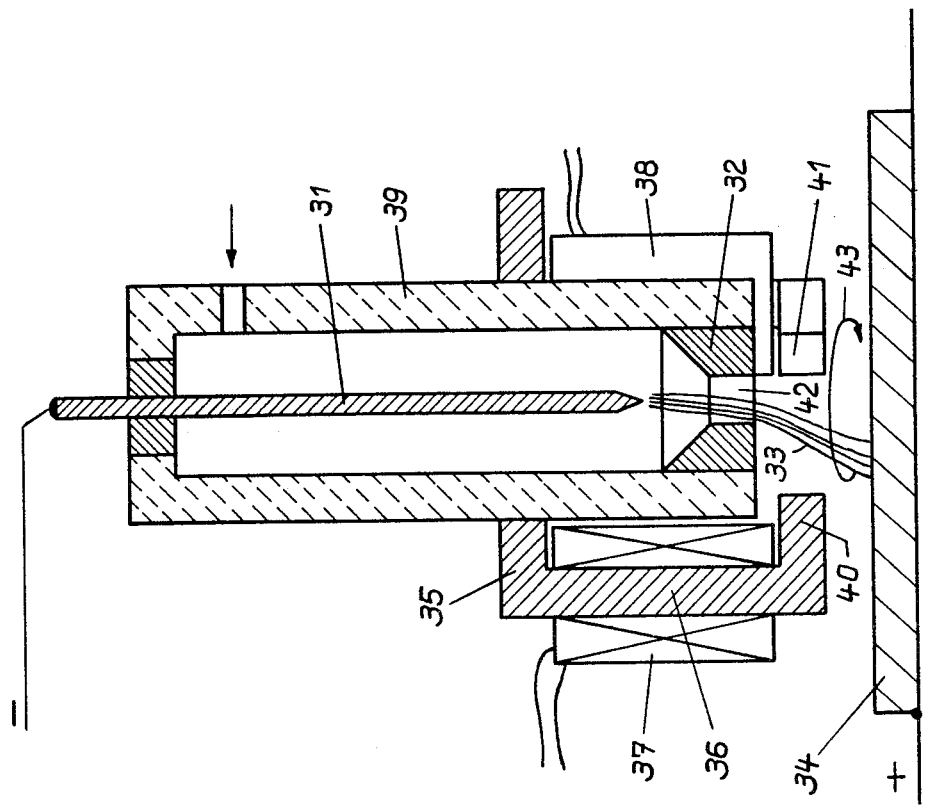
Fig. 5
Fig. 6

METHODS AND DEVICES FOR CUTTING, ERODING, WELDING AND DEPOSITING METALLIC AND NON-METALLIC MATERIALS BY MEANS OF AN ELECTRIC ARC

This is a continuation, of application Ser. No. 652,750, filed Jan. 27, 1976, now abandoned.

The invention relates to the cutting, eroding, welding and depositing of metallic and non-metallic materials by means of electric arcs.

Some known arc welding devices have a d.c. or an a.c. electromagnet producing a magnetic field to impart a rectilinear oscillating movement to the arc. These known devices were designed to replace the previous mechanical means for rocking the torch to make the arc oscillate along a rectilinear path. In other known arec welding devices the arc is made to turn by submitting it to a turning magnetic field.

According to the invention there is provided a method of cutting, eroding, welding or depositing a metallic or non-metallic material by means of an electric arc that is made to turn by submitting it to a turning magnetic field, comprising controlling the trajectory and the speed of at least one of the ends of the arc.

The invention also proposes a device for carrying out such a method comprising means for producing, in the proximity of the arc, a turning magnetic field acting on the arc to make it turn, and means for controlling the trajectory and the speed of at least one of the ends of the arc.

It can be seen that the invention is distinguished from the aforementioned known methods and devices in that the path and the rotational speed of the arc are controlled. The important advantages that this involves will be mentioned later.

The accompanying drawings show, by way of example, several embodiments of devices according to the invention, illustrating several manners of carrying out the method. In the drawings:

FIG. 5 is an axial cross-section of a second embodiment;

FIG. 6 is an axial cross-section of a third embodiment; and

Figure 1:
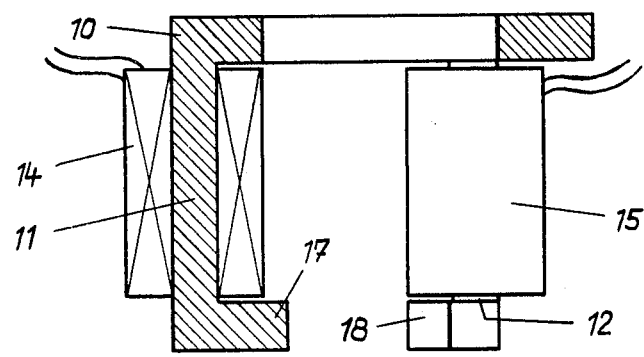
FIG. 1 is an axial cross-section of a magnetic armature, in cross-section along line 1—1 of FIG. 2.
Figure 2:
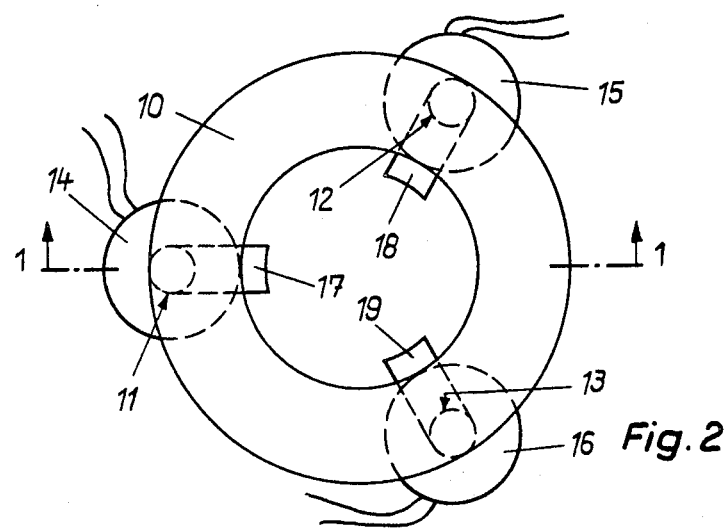
FIG. 2 is a plan view of the armature of FIG. 1.
Figure 3:
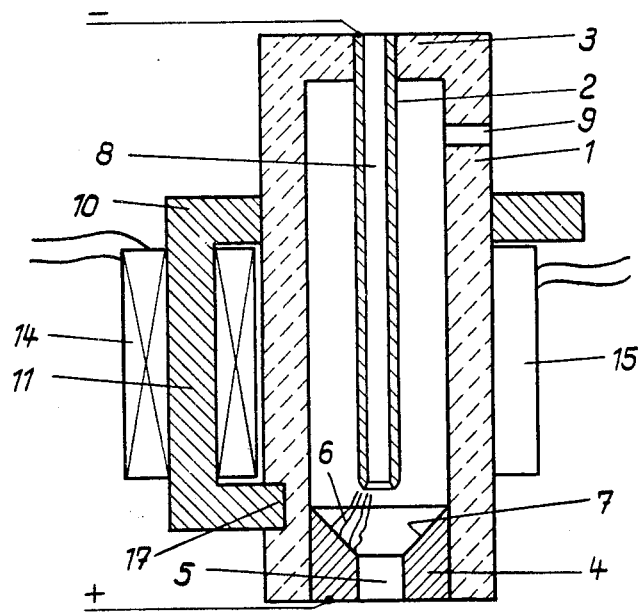
FIG. 3 is an axial cross-section of a first embodiment of device, namely a torch surrounded by the armature of FIGS. 1 and 2.

The embodiment of FIGS. 1 to 3 comprises a plasma torch of the non-transferred arc type having a refractory sleeve 1 in which is disposed an electrode 2 connected to the negative terminal of a supply. Electrode 2 is fixed at a closed end 3 of sleeve 1. At its opposite end, the sleeve 1 has, as is known, a second electrode 4 formed by a metal piece with an axial bore 5. This second electrode 4 is connected to the positive terminal of the supply to produce an arc 6 between the free end of electrode 2 and an inner conical part 7 of electrode 4.

Figure 4:
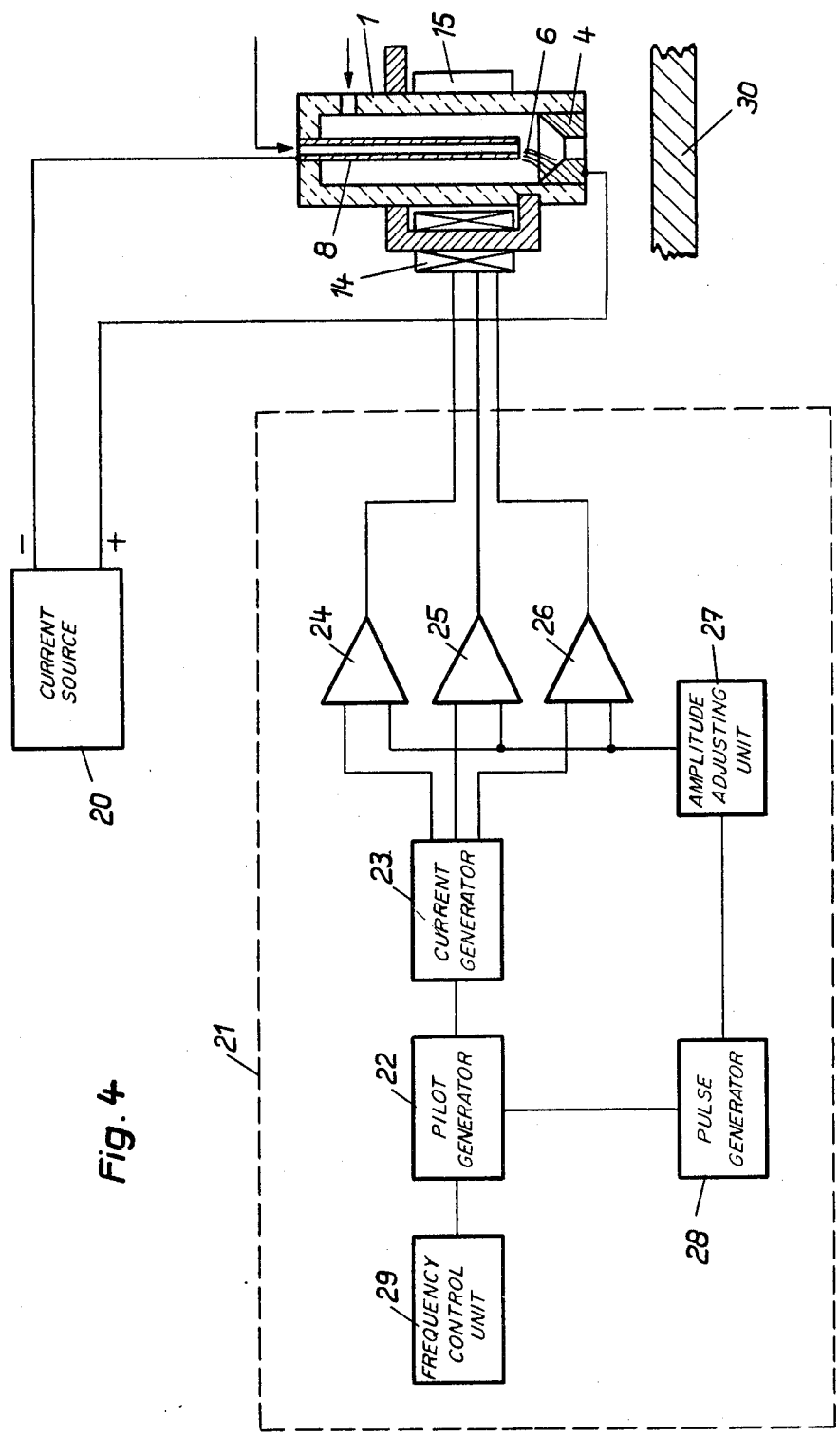
FIG. 4 is an overall schematic diagram of the first embodiment of device.

The electrode 2 has an axial duct 8 through which a gas is fed and the wall of sleeve 1 also has an orifice 9 for the supply of gas. These gases may, according to the case, be chosen to provide cooling, chemical protection or to produce desired arc characteristics (i. e. be ionizable, dissociable). The gases are discharged as a plasma by bore 5 and act, as is known, on a workpiece 30 (FIG. 4). All that has just been described is known. The device additionally has an annular magnetic armature 10 having three arms 11, 12, 13 about each of which is disposed a respective winding 14, 15, 16. The arms 11, 12, 13 each terminate with a pole piece 17, 18, 19 disposed in star configuration angularly spaced at 120° to one another, as shown on FIG. 2. The armature 10 with its windings 14, 15, 16 surrounds the sleeve 1, as shown in FIG. 3. The pole pieces (of which only one, 17, is visible on FIG. 3) are disposed adjacent to and facing the region in sleeve 1 where the arc 6 is produced.

The three windings are each fed by one of the phases of a triphase current in a manner to produce a turning magnetic field. When the windings 14, 15, 16 are supplied with triphase current, the turning magnetic field produced by the pole pieces 17, 18, 19 acts on arc 6 and causes it to turn about the axis of the torch.

This rotation of the arc has the advantage of ensuring an absolutely homogeneous distribution of energy, which favorizes cooling of the electrodes 2 and 4 and consequently enables a reduction of their dimensions.

FIG. 4 schematically shows the overall device, i.e. the torch of FIG. 3 with its means of supplying and for controlling rotation of the arc. On this figure, the current source supplying arc 6 is designated by 20, and 21 designates the installation for supplying polyphase current (triphase, in the example given) to windings 14, 15, 16. Installation 21 comprises a variable-frequency pilot generator 22, a polyphase current generator 23 piloted by generator 22, and three amplifiers 24, 25, 26 supplying current to the windings 14, 15, 16. Amplifiers 24, 25, 26 are controlled by an amplitude-adjusting unit servocontrolled by a pulse generator 28 itself controlled by pilot generator 22. Unit 29 is a frequency control unit and 30 designates the metallic or non-metallic workpiece.

Amplifiers 24, 25, 26 being controlled by unit 27 are voltage controlled amplifiers (V.C.A.). Thus the polyphase sinusoidal alternating current generated by 23 is modulated, in said amplifiers, by the voltage generated by 28–27 and the output of the amplifiers 24, 25, 26 is a triphase modulated alternating volatge which energizes the coils 14, 15, 16 respectively and thus produces a rotating magnetic field, the speed of rotation and intensity of which varies according to the instantaneous voltages of this triphase modulated alternating current. Consequently, the trajectory and the speed of at least one end of the arc are controlled.

The function of the pulse generator 28 is to supply the amplifiers 24, 25, 26 through unit 27, with a voltage which controls the gain of these amplifiers, i.e. which varies the amplitude of the turning magnetic field as a function of time by varying as a function of time the voltage of the polyphase current issuing from the amplifiers.

The frequency control unit 29 supplies the variable frequency pilot generator 22 with a voltage which controls, (i.e. determines) the frequency generated by 22.

This voltage can be constant or can vary as a function of time, and in the latter case, the result is that the frequency of the polyphase current varies as a function of time, with the consequence that the speed of rotation of the turning magnetic field also varies as a function of time.

In relation to devices with a direct supply from an industrial (mains) polyphase network, the described device has the great advantage of enabling several frequencies to be set at will.

FIG. 5 shows a torch with a transferred plasma arc. The torch is of analogous construction to that of FIG. 3, except that negative electrode 31 is solid and piece 32, equivalent to 4 of FIG. 3, no longer forms the positive electrode but acts as means for constricting the arc 33, the workpiece 34 being connected to the positive terminal of the supply. The electromagnetic means for rotating the arc are analogous to those of FIGS. 1 to 3, but with the following differences: the armature 35 with arms such as 36 and windings such as 37, 38 arranged in star-configuration as in the first embodiment are disposed about the refractory sleeve 39 in such a manner that the pole pieces (of which two, 41, 42, are visible) are adjacent bore 42 of piece 32, in the region between piece 32 and the workpiece 34. With this arrangement, the turning magnetic field produced by the pole pieces acts on part of arc 33 outside the torch and makes it turn as indicated by arrow 43.

FIG. 6 shows a torch of the so-called "TIG" type operating with a gaseous flux and a refractory electrode. The refractory electrode 44 is disposed axially in a refractory sleeve 45, with a free end of the electrode engaged in an opening 46 at one of the ends of sleeve 45. An arc 48 is produced between the point of electrode 44 and a workpiece 47. Arrow 49 indicates how the arc 48 turns under the effect of the turning magnetic field produced by three pole pieces of which only two, 50, 51, are visible. The electromagnetic means for rotating the arc are identical to those described with reference to FIG. 5.

Figure 7:
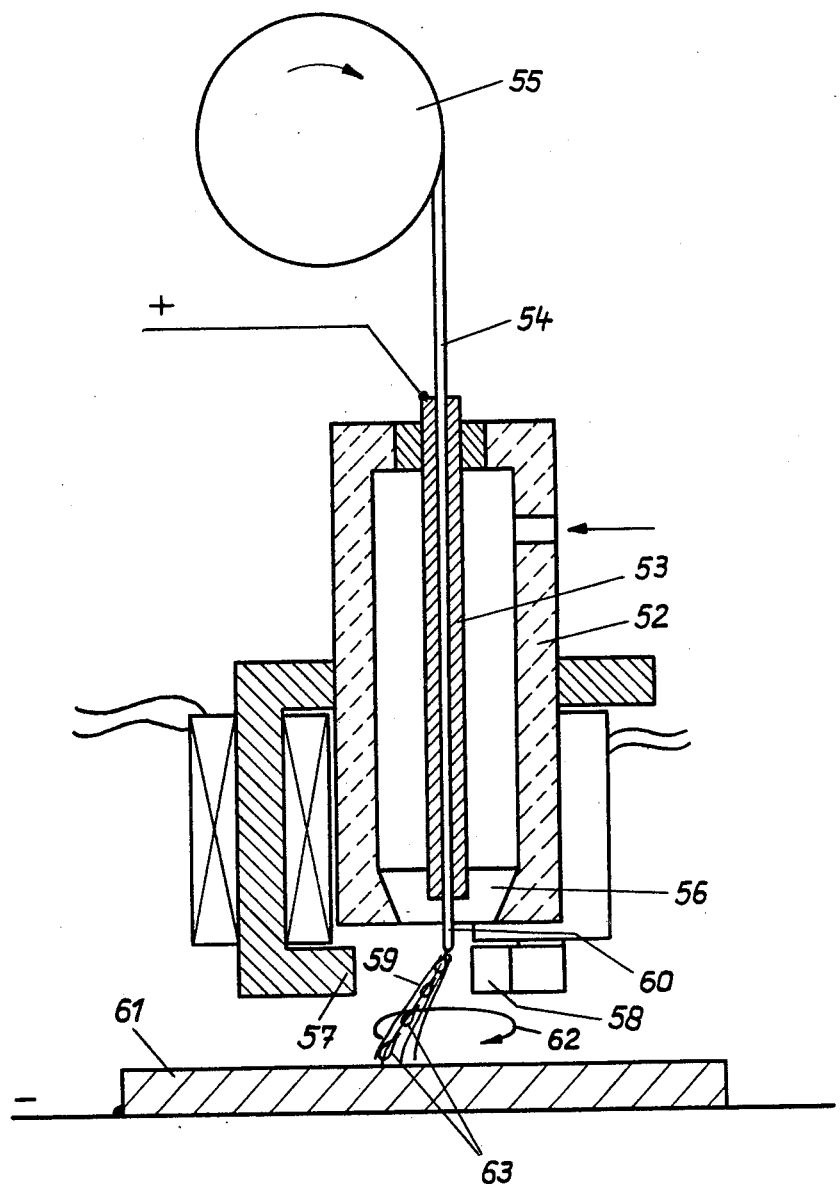
FIG. 7 is an axial cross-section of a fourth embodiment.

FIG. 7 shows a fusible-electrode torch operating with gaseous flux. In a refractory sleeve 52 is axially disposed a metal tube 53 connected to the positive terminal of the arc supply. Tube 53 guides an electrode-forming fusible metal wire 54 which is progressively unwound from a spool 55 in operation of the device. Sleeve 52 has a central opening 56 at its end opposite that to which tube 53 is fixed. The means for rotating the arc are the same as those of FIGS. 5 and 6, and comprise three pole pieces disposed at 120° (of which two, 57, 58 are shown) and acting on the arc 59 passing between the end 60 of fusible electrode 54 and the workpiece 61 which is connected to the negative terminal of the arc supply. Arrow 62 indicates the rotational movement of arc 59 under the action of the turning field.

In operation, drops 63 of metal from the fusible electrode 60 are deposited on piece 61.

By associating the various described devices with a control installation such as 21 of FIG. 4, it is possible to control the energy density transmitted to the workpiece and, moreover, when a fusible electrode is employed, the transfer to the workpiece can be controlled. The turning magnetic field can be regulated in amplitude and speed of rotation, in a periodic or non-periodic manner, by the supply voltage and frequency, and by the arrangement of the windings. By varying, as a function of time, the supply voltage and frequency either separately or simultaneously, it is possible to obtain arc pulsation effects which are rendered perfectly controllable. It is hence possible on an area of the workpiece delimited by an external contour corresponding to the greatest amplitude of the arc and inner contour corresponding to the smallest amplitude of the arc, to distribute energy as a function of the desired results: homogenous density of the transmitted energy, penetration effect, structural effect, etc. Of course, these contours may be circular, elliptical or of other shapes. By turning the arc sufficiently rapidly, it is possible to make it form a pratically continuous bell-shaped or cylindrical sheet. This enables, for a given current, an appreciable gain to be obtained in the arc voltage and, consequently, in the arc power. This voltage increase is closely related to the energy-absorption possibilities of the various gases used, for example dissociable gases such as $H_2$ and $N_2$.

By forming a continuous sheet in this manner, the dissociable gases used are caused to remain inside the volume limited by the sheet, which ensures that practically the entire mass of gas in this volume is dissociated. In other words, the degree of ionization is considerably increased.

These effects have a favorable incidence on the dimensions of non-transferred arc torches since, for a given power, the anode operates at relatively lower currents and is subjected to lesser sollicitations, which avoids damage to or premature destruction of the anode. These plasma torches with non-transferred arcs are used in very diverse fields such as for the deposit of refractory materials, electro-erosion and the cutting of stony materials and non-conductors and, of course, operations on metal pieces.

Naturally, the arrangement for providing a turning field could be conceived for supply by a polyphase current other than triphase.

What is claimed is:

1. In a device for cutting, eroding, welding or depositing a metallic or non-metallic material by means of an electric arc, first means for producing an electric arc, second means for producing, in the proximity of the arc a turning magnetic field acting on the arc to make it turn, said second means comprising a polyphase alternating current generator for producing said turning magnetic field acting on the arc to make it turn, and third means comprising voltage controlled amplifiers fed by said second means, and a pulse generator for controlling the gain of said amplifiers the output of said voltage controlled amplifiers connected to means for producing said turning magnetic field.

* * * * *